Figure 1:
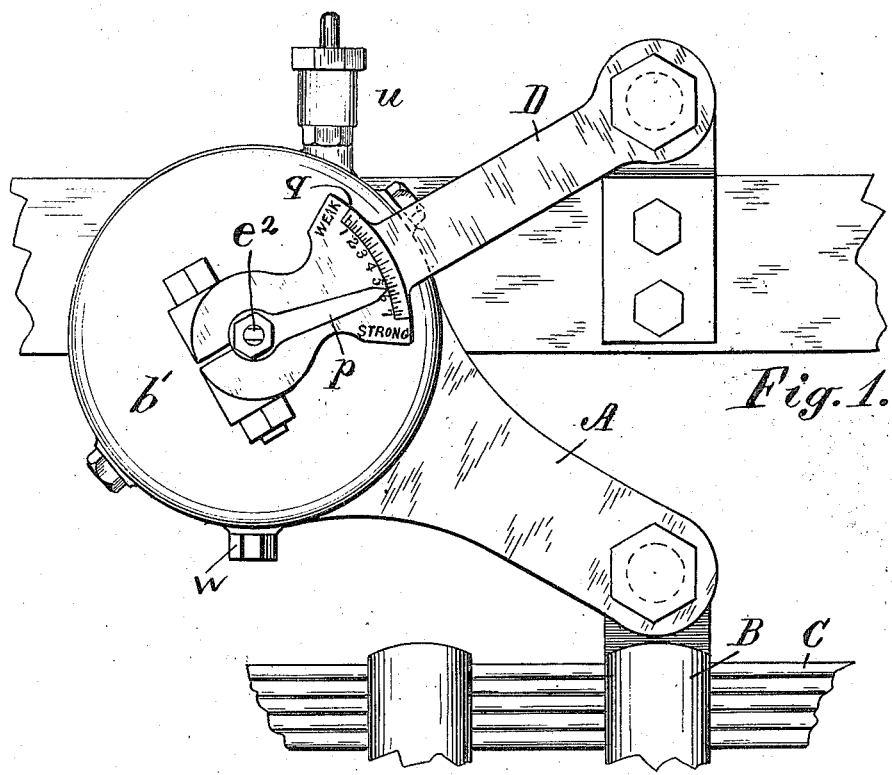

A. PETELER.
SHOCK ABSORBER.
APPLICATION FILED FEB. 20, 1912.

1,072,770.

Patented Sept. 9, 1913.
2 SHEETS—SHEET 1.

Witnesses
L. Lee
J. Walter Greenbaum

Inventor
Adolph Peteler, per
Thomas S. Crane, Atty.

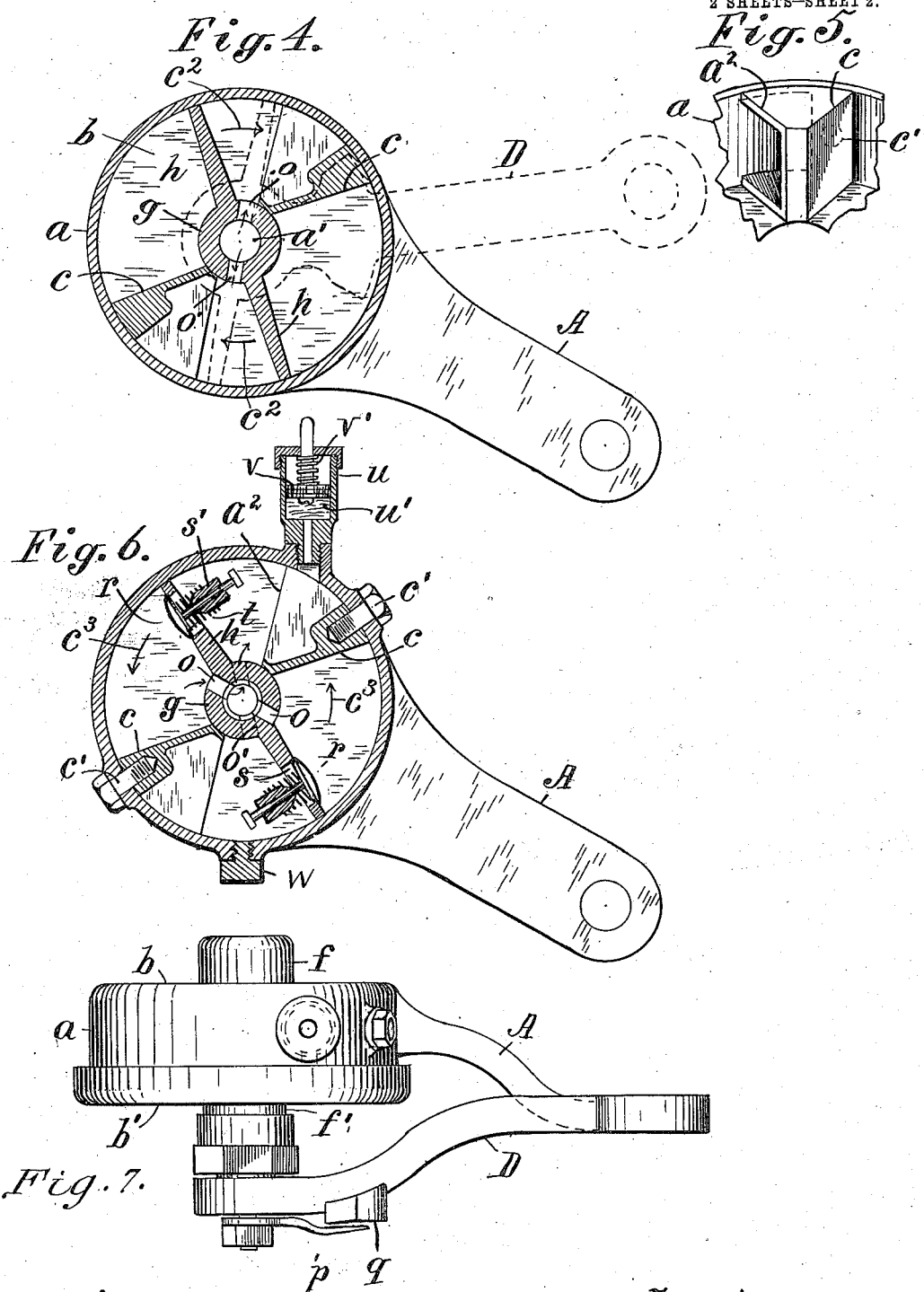

UNITED STATES PATENT OFFICE.

ADOLPH PETELER, OF NEW YORK, N. Y.

SHOCK-ABSORBER.

1,072,770.

Specification of Letters Patent.  Patented Sept. 9, 1913.

Application filed February 20, 1912. Serial No. 678,813.

*To all whom it may concern:*

Be it known that I, ADOLPH PETELER, a citizen of the United States, residing at 330 West Seventieth street, New York, county of New York, and State of New York, have invented certain new and useful Improvements in Shock-Absorbers, fully described and represented in the following specification and the accompanying drawings, forming a part of the same.

This invention relates to that class of shock absorbers in which a cylindrical box is provided with abutments and filled with liquid, and a spindle is fitted to rotate in the box and provided with wings to press upon the liquid; the box and spindle being attached at their outer ends to the vehicle parts which need restraint. Violent movements of the vehicle body require resistance in both directions, but less during the downward movement, which is also resisted by the vehicle springs. During the reactive movements when the springs are lifting the body the resistance of the brake must be stronger, and in order to provide for varying the resistance in these movements, holes are extended through the spindle and the wings, or through both, and provided with valves to regulate the movement of the fluid from one side of the wings to the other. The valves applied to the holes in the wings operate automatically under sudden movements of the apparatus; but the holes extended through the spindle connect with opposite sides of the wings, and are governed by a hollow cylindrical or cup-shaped valve arranged within the spindle and adapted by a comparatively small movement to wholly prevent the passage of fluid through such holes. The stem of the valve projects beyond the outer end of the spindle so that it may be moved to produce a weak or strong resistance. A packing is applied to the shoulder of the valve within the spindle so as to prevent leakage, which would destroy the operation of the device, and an index-finger and scale are provided to show the adjustment of the valve accurately so that it may be changed in a definite degree, or so that the valve may be restored to any previous adjustment which has been found satisfactory for rough or smooth roads. Normally open spring-valves of special construction are seated upon valve-openings in the wings, which permit an open communication between the opposite sides of the wings and thus prevent any resistance to the movement of the fluid during slow or slight movements of the vehicle body, but any sudden movements operate to close the valves during the reactive movement of the vehicle body, and thus impose the increased resistance to the vehicle body that is then required.

The construction will be understood by reference to the annexed drawing, in which—

Figure 2:
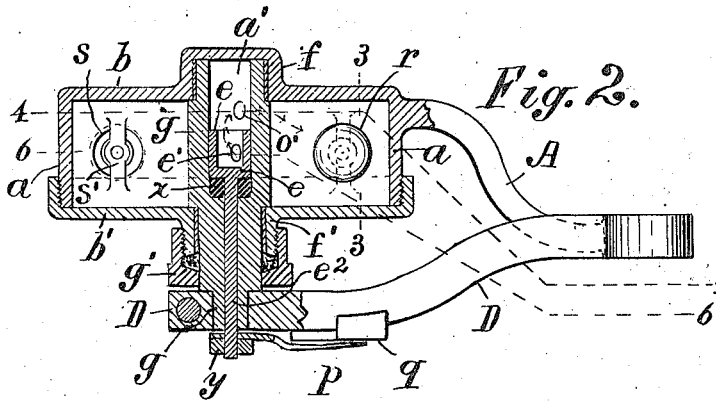
Figure 3:
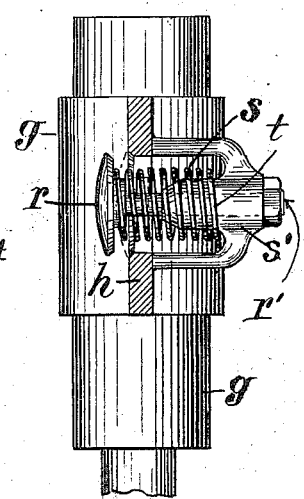

Figure 1 shows the shock-absorber in its relation to the vehicle parts; Fig. 2 is a horizontal section through the spindle of the shock-absorber; Fig. 3 is a section through one of the self-acting wing-valves taken on line 3—3 in Fig. 2, and looking toward the spindle which carries the wings; Fig. 4 is a section on line 4—4 in Fig. 2; Fig. 5 is a perspective view of one of the abutments with that side of the box to which it is attached; Fig. 6 is a section on line 6—6 in Fig. 2; and Fig. 7 is a plan of the shock-absorber detached from the vehicle.

A designates one of the jointed arms attached to a clip B upon the vehicle spring C, and D designates the jointed arm attached to the movable body or frame of the vehicle. The arm A is provided with the box $a$ having a fixed head $b$ and a removable head $b'$, the box having the abutments $c$ secured therein by screws $c'$ through the shell of the box. The abutments are provided with flat flanges $a^2$ next the heads $b$, $b'$ of the box, the flanges lying against such heads and being fitted against the shell of the box which holds them firmly to resist the violent strain which is at times imposed upon them by the movements of the wings. The flanges are upon the side of the abutment opposite that which receives the strain so that they are strongly braced against the shell of the box. The abutments are thus as strong as if integral with the box, while their removability greatly facilitates the boring of the box to make its bore cylindrical. The heads are provided with bearings $f$ and $f'$, and a spindle $g$ is journaled in the bearings, and the arm D is connected detachably to its outer end. The spindle has radial wings $h$ attached thereto which are movable during the oscillations of the spindle in the spaces between the abutments, and the entire space in the box is filled with a non-freezing agent, like glycerin, and a stuffing-box $g'$ is provided upon the bearing $f'$ at the neck of the spindle to prevent leakage of the liquid thereat. The arms are so connected to the vehicle parts that the wings, when the vehicle body moves downwardly, oscillate toward the abutments in the direction shown by the arrows $c^2$ in Figs. 4 and 5, and in the reactive movement of wings oscillate toward the opposite sides of the abutments, as indicated by the arrows $c^3$ in Fig. 6. The space containing the arrows $c^3$ is the pressure-side of the wings, while the space in which the arrows $c^2$ are located may be termed the negative-side upon which the construction hereinafter described prevents any pressure from occurring. The body of the spindle has a cylindrical tubular bore $a'$ at its inner end and transverse holes $o, o'$ extended from the bore outwardly to the spindle at different points in the length of the said bore, and a cylindrical hollow valve $e$ is fitted to the bore at its inner end where it can cover the holes $o$, but leaving the holes $o'$ constantly uncovered. The transverse holes $o, o'$ extend through the body at different angles to the wings so that the holes $o$ connect with the spaces upon the forward side of the wings and the holes $o'$ connect with the spaces upon the rear side of the wings, as shown in Fig. 6. The holes at opposite sides of the spindles are thus in communication with the spaces at opposite sides of both abutments.

The hollow valve $e$ has a stem $e^2$ extending through the spindle and beyond its outer end, and its interior is open toward the holes $o'$, and it has holes $e'$ which correspond with the holes $o$ when the valve is suitably turned. In such adjustment of the valve, the brake opposes a weak resistance to the shocks upon the vehicle body as the by-pass channel is held open, but the turning of the valve to wholly or partially close such channels increases the resistance in any desired degree. An index $p$ for turning the stem on the said valve is shown in Figs. 1 and 2, and a scale $q$ is shown upon the arm D by which the valve $e$ may be turned and the channel $o$ opened or closed, the resistance in such positions being indicated upon the index by the words "Weak" and "Strong" and intermediate numbered marks upon the scale express the various graduations of resistance in such intermediate position. The numbered marks upon the scale $q$ enable the operator to record any adjustment which proves suitable for roads in a given condition; so that the adjustment of the valve may be changed when necessary and restored to any point which was previously found desirable for certain conditions of the roads.

Automatic means of increasing the resistance to severe shock is shown in the valves $r$ which are seated upon valve-openings $s$ in the wings $h$ and guided by yokes $s'$, the valves moving toward the liquid in the box during the reactive movement of the shock-absorber, and being held normally open by very light springs $t$ so that the liquid can pass through the openings $s$ if the movement of the wings be slow; but if the shock-absorber receives a violent reactive movement the inertia of the liquid in the box pushes the valves shut and thus promptly increases the resistance of the absorber. The yoke $s'$ is provided upon the side of the wing opposite to that where the valve is seated, so as not to interfere at all with the movement of the liquid toward the valve, and the valve-stem $r'$ extends from the valve through the yoke and has a collar upon its outer end. The yoke is arched from the side of the wing sufficiently to insert the spring $t$ between the top of the yoke and the valve $r$ so as to press the same normally away from the wing. This arrangement of the valve $r$ to close automatically during a quick reactive movement affords the device a free play when subjected to slight movements, thus easing the movement of the vehicle body until it is jolted sufficiently to require the braking effect of the shock-absorber, which then comes into action automatically to check such violent movements.

I have found by experience that if a tightly closed box or casing be completely filled with liquid, its joints are strained by the expansion of the liquid when subjected to increase of temperature, and I therefore provide a supply-chamber $u$ containing a surplus of liquid $u'$ which is pressed normally and continually toward the interior of the box by a piston $v$ having a spring $v'$. Such spring-piston yields upon any expansion of the liquid upon the box, while the piston in the reverse condition is pressed toward the box by the spring and the box thus kept supplied at all times. Such spring piston does not move through the liquid and is thus distinguished from any valve connected with a supply chamber. It simply exerts a yielding pressure continually upon the liquid in the box. The box is connected with the space upon the negative side of the wings in which no pressure occurs, and the piston is therefore able to perform its functions without any obstruction. Pressure upon the negative side of the wings is prevented by the normal opening of the valves $r$ when the wings move toward their negative side where the arrows $c^3$ are located in Fig. 6.

The valve $r$ in Fig. 3 is shown open, which is its normal position; but in Fig. 6 the valves are shown closed, as would be the case if the wings were moved suddenly in the direction of the arrows $c^3$ under a violent shock, such closing of the valve preventing the passage of liquid from one side of the wings to the other, the only remaining passage for the movement of the liquid then being through the aperture $o$ which is regulated by the valve $e$.

A draining plug $w$ is shown in the bottom of the box by which the liquid may be withdrawn when it is necessary to renew the same, the fresh supply being inserted through the supply-chamber $u$, by removing its cap which holds the piston and spring in place.

A packing $x$ is inserted in the bore $a'$ of the valve stem $g$ between the shoulder of the valve $e$ and the bottom of the bore $a'$, to prevent leakage past the stem where it extends beyond the outer end of the spindle $g$, and such packing may be adjusted by a nut $y$ applied to the outer end of the stem over the index-arm $p$. The valve-stem is flattened, as shown upon the end of the same in Fig. 1, to fit a corresponding hole in the index arm $p$, which permits the valve-stem to slide through the index arm when it is moved by the nut $y$ to tighten the packing $x$.

My improvements render the shock absorber more efficient without adding materially to its cost.

Having thus set forth the nature of the invention what is claimed herein is:

1. In a shock absorber having a cylindrical box with abutments therein and a spindle rotatable in the box with radial wings movable between the abutments and having each a valve-opening therethrough, the combination, with each of such wings, of the yoke $s'$ projected from one side of the wing centrally over the valve-openings, the valve $r$ fitted to seat upon the opposite side of the wing and having stem $r'$ fitted movably to the yoke, and a spiral spring $p$ fitted to the valve within the yoke and operating to hold the valve normally from its seat, the access of fluid to the valve and opening beneath the same being thus unobstructed by the yoke.

2. In a shock absorber having jointed arms, the combination, with one of the arms, of a cylindrical box with abutments therein, a spindle rotatable in the box and attached to the other arm and having rotary wings movable between the abutments, liquid filling the interspaces in the box, the supply-chamber $u$ in open communication with the liquid within the box and having a supply of liquid therein, and a piston $v$ with a spring $v'$ applied to the outer side of the liquid in the supply-chamber and operating to press the liquid continually into the box and, to yield when required to relieve expansion of the liquid in the box.

3. In a shock absorber having jointed arms, the combination, with one of the arms, of a spindle having wings attached thereto, a cylindrical box fitted to the spindle and wings and attached to the other arm, and having between the wings the abutments $c$ secured removably in the box by screws $c'$, and provided each with flanges $a^2$ next the heads of the box pressed against the shell of the box to resist the strain imposed by the movement of the wings.

In testimony whereof I have hereunto set my hand in the presence of two subscribing witnesses.

ADOLPH PETELER.

Witnesses:
 L. LEE,
 THOMAS S. CRANE.